(12) United States Patent
Elmenthaler et al.

(10) Patent No.: US 11,132,297 B2
(45) Date of Patent: Sep. 28, 2021

(54) ADDRESSING SCHEME FOR DISTRIBUTED HARDWARE STRUCTURES

(71) Applicant: Advantest Corporation, Tokyo (JP)

(72) Inventors: Jens Elmenthaler, Holzgerlingen (DE); Klaus Welch, Leinfelden-Echterdingen (DE)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 15/887,541

(22) Filed: Feb. 2, 2018

(65) Prior Publication Data
US 2018/0157588 A1 Jun. 7, 2018

Related U.S. Application Data

(63) Continuation of application No. PCT/EP2015/068002, filed on Aug. 4, 2015.

(51) Int. Cl.
*G06F 12/06* (2006.01)

(52) U.S. Cl.
CPC .. *G06F 12/0661* (2013.01); *G06F 2212/1016* (2013.01)

(58) Field of Classification Search
CPC ............ G06F 12/0661; G06F 2212/1016
See application file for complete search history.

(56) References Cited

U.S. PATENT DOCUMENTS

| | | | |
|---|---|---|---|
| 6,128,016 A * | 10/2000 | Coelho | G06F 3/033 707/999.102 |
| 7,222,800 B2 * | 5/2007 | Wruck | C09D 5/4492 236/51 |
| 7,327,730 B2 | 2/2008 | Chen et al. | |
| 7,548,541 B2 | 6/2009 | Ishwar et al. | |
| 7,609,689 B1 | 10/2009 | Desanti et al. | |
| 7,904,186 B2 | 3/2011 | Mairs et al. | |
| 8,037,303 B2 | 10/2011 | Williamson | |
| 8,582,468 B2 * | 11/2013 | Williamson | H04L 12/185 370/254 |
| 9,027,042 B2 * | 5/2015 | Lonstein | H04N 21/44236 380/201 |
| 9,591,060 B1 * | 3/2017 | Diwakar | H04L 67/10 |
| 2002/0191628 A1 * | 12/2002 | Liu | H04L 12/18 370/428 |
| 2005/0114382 A1 | 5/2005 | Lakshminarayan et al. | |
| 2007/0061046 A1 | 3/2007 | Mairs et al. | |
| 2007/0296613 A1 * | 12/2007 | Hussain | H04N 19/61 341/50 |
| 2009/0156198 A1 * | 6/2009 | Lee | H04W 24/08 455/425 |
| 2010/0272105 A1 | 10/2010 | Li et al. | |

(Continued)

*Primary Examiner* — Henry Tsai
*Assistant Examiner* — Aurangzeb Hassan (57) ABSTRACT

Embodiments of the present invention provide an apparatus having a plurality of selectable entities having associated physical addresses, wherein the selectable entities are connected to a controller, wherein the selectable entities have a selectable processor configured to determine in response to a common control information a current select information on the basis of selectable logic combinations of a first information describing whether the selectable entity belongs to a first group and a second information describing whether the selectable entity belongs to a second group.

21 Claims, 7 Drawing Sheets

(56) References Cited

U.S. PATENT DOCUMENTS

| | | | |
|---|---|---|---|
| 2011/0093515 A1* | 4/2011 | Albanese | G06Q 30/02 |
| | | | 707/812 |
| 2013/0085582 A1 | 4/2013 | Kaneko et al. | |
| 2014/0136139 A1* | 5/2014 | LaBonge | H04B 10/07 |
| | | | 702/122 |
| 2019/0139125 A1* | 5/2019 | Ynion, Jr. | G06Q 30/0635 |
| 2019/0156250 A1* | 5/2019 | Jiwani | G06Q 10/02 |
| 2021/0036788 A1* | 2/2021 | Subramanian | H04B 17/29 |

* cited by examiner

ADDRESSING SCHEME FOR DISTRIBUTED HARDWARE STRUCTURES

CROSS-REFERENCE TO RELATED APPLICATION

This application is a continuation of copending International Application No. PCT/EP2015/068002, filed Aug. 4, 2015, which is incorporated herein by reference in its entirety.

BACKGROUND OF THE INVENTION

Embodiments of the present invention relate to an apparatus. Further embodiments relate to a method for operating an apparatus. Some embodiments relate to unified addressing in Datapath.

Figure 1:
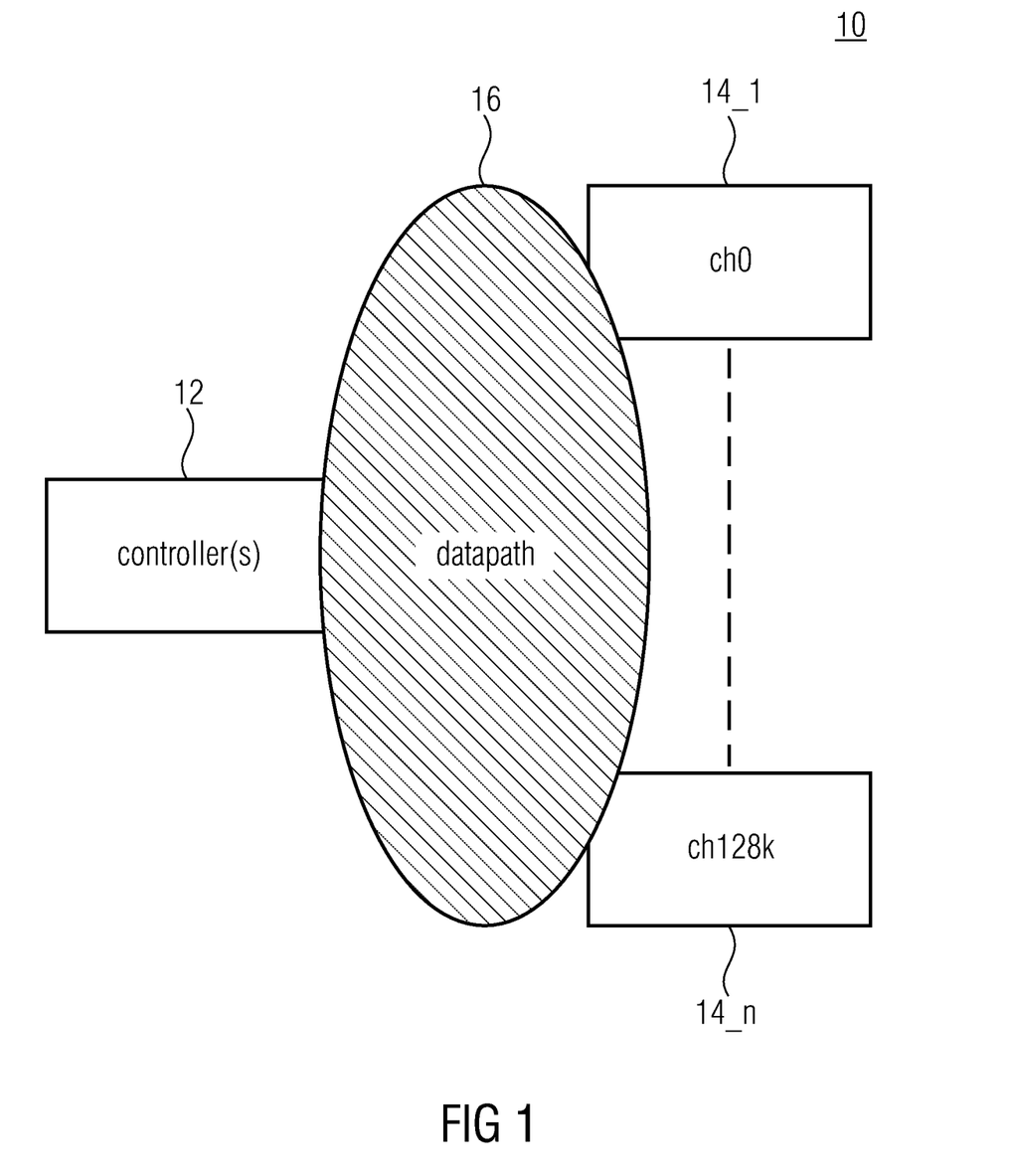
FIG. 1 shows a schematic block diagram of a conventional automatic test equipment.

FIG. 1 shows a schematic block diagram of a conventional automatic test equipment 10. The automatic test equipment comprises one or more controller(s) 12 and a plurality of channels 14_1 to 14_n, such as 128k channels 14_1 to 14_128k, connected to the controller(s) 12 via a data path 16.

In order to improve the performance of the automatic test equipment 10, there is the need to communicate with groups of channels in parallel. For example, a known test processor supports 32 groups of channels. Further, a known control board FPGA (FPGA=field programmable gate array) keeps tables for 512 groups and reconfigures the known test processor autonomously. However, there are no arithmetics to combine groups. Further, separate logical and geographical addressing are used, and common channels are memory mapped.

Therefore, it is the object of the present invention to provide an improved concept for defining groups of channels.

SUMMARY

An embodiment may have an apparatus having a plurality of selectable entities having associated physical addresses, wherein the selectable entities are connected to a controller, wherein the selectable entities have a select processor configured to determine in response to a common control information a current select information on the basis of selectable logic combinations of a first information describing whether the selectable entity belongs to a first group and a second information describing whether the selectable entity belongs to a second group.

According to another embodiment, a method for operating an apparatus, the apparatus having a plurality of selectable entities having associated physical addresses, wherein the selectable entities are connected to a controller, may have the step of: determining in the selectable entities in response to a common control information a current select information on the basis of selectable logic combinations of a first information describing whether the selectable entity belongs to a first group and a second information describing whether the selectable entity belongs to a second group.

Another embodiment may have an inventive apparatus or method as mentioned above, wherein the apparatus is an automatic test equipment.

Still another embodiment may have a non-transitory digital storage medium having stored thereon a computer program for performing a method for operating an apparatus, the apparatus having a plurality of selectable entities having associated physical addresses, wherein the selectable entities are connected to a controller, the method having the steps of: determining in the selectable entities in response to a common control information a current select information on the basis of selectable logic combinations of a first information describing whether the selectable entity belongs to a first group and a second information describing whether the selectable entity belongs to a second group, when said computer program is run by a computer.

Embodiments of the present invention provide an apparatus (e.g., an automatic test equipment) comprising a plurality of selectable entities having associated physical addresses, wherein the selectable entities are connected to a controller, wherein the selectable entities comprise a select processor configured to determine in response to a common control information a current select information on the basis of selectable logic combinations of a first information describing whether the selectable entity belongs to a first group and a second information describing whether the selectable entity belongs to a second group.

Further embodiments provide a method for operating an apparatus (e.g., an automatic test equipment). The apparatus comprises a plurality of selectable entities having associated physical addresses, wherein the selectable entities are connected to a controller. The method comprises determining in the selectable entities in response to a common control information a current select information on the basis of selectable logic combinations of a first information describing whether the selectable entity belongs to a first group and a second information describing whether the selectable entity belongs to a second group.

BRIEF DESCRIPTION OF THE DRAWINGS

Embodiments of the present invention are described herein making reference to the appended drawings.

DETAILED DESCRIPTION OF THE INVENTION

Equal or equivalent elements or elements with equal or equivalent functionality are denoted in the drawings and the following description by equal or equivalent reference numerals.

In the following description, a plurality of details are set forth to provide a more thorough explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments herein after may be combined with each other, unless specifically noted otherwise.

Figure 2:
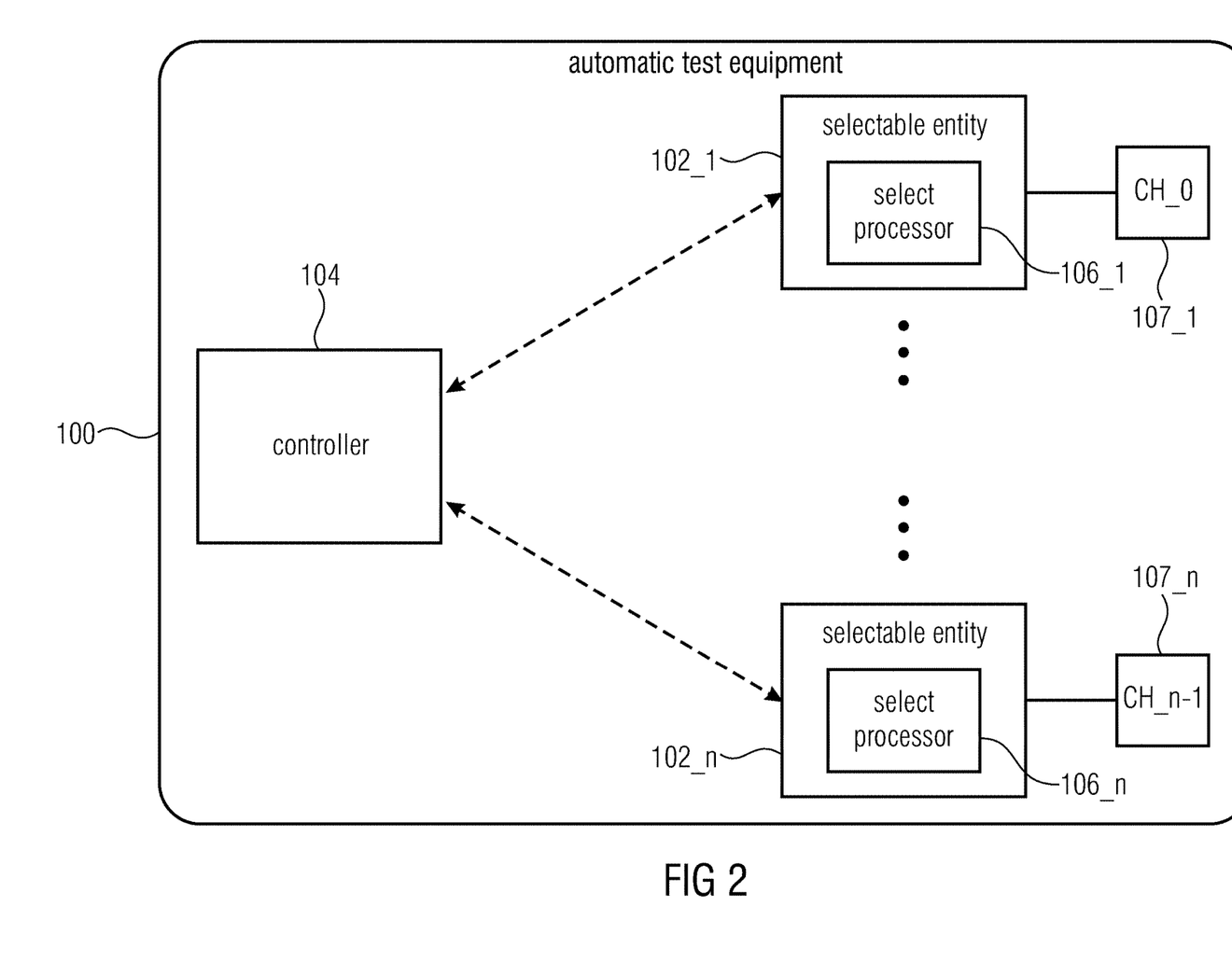
FIG. 2 shows a schematic block diagram of an automatic test equipment according to an embodiment of the present invention.

FIG. 2 shows a schematic block diagram of an automatic test equipment 100 according to an embodiment of the present invention. The automatic test equipment 100 comprises a plurality of selectable entities 102_1 to 102_n, wherein the selectable entities 102_1 102_n are connected to a controller 104 of the automatic test equipment 100. The selectable entities 102_1 to 102_n comprise a select processor 106_1 to 106_n configured to determine in response to a common control information a current select information on the basis of selectable logic combinations of a first information describing whether the selectable entity belongs to a first group and a second information describing whether the selectable entity belongs to a second group.

In embodiments, the current select information may indicate whether the selectable entity belongs to a currently selected group.

In embodiments, the automatic test equipment 100 may comprise up to n selectable entities 102_1 to 102_n, wherein n is a natural number equal to or greater than two, n≥2. Further, each of the selectable entities 102_1 to 102_n may comprise a (or one) select processor 106_1 to 106_n, such that the number of select processors 106_1 to 106_n is equal to the number of selectable entities 102_1 to 102_n. Note that the automatic test equipment 100 may possibly comprise further selectable entities (not shown in FIG. 2) which do not necessarily have to comprise a select processor.

Further, as shown in FIG. 2, the automatic test equipment 100 can comprise a plurality of selectable channels 107_1 to 107_n connected to the controller 104 via the selectable entities 102_1 to 102_n. The automatic test equipment 100 can be configured to select a (logic) group of channels and/or define a new logical group of channels out of the plurality of selectable channels 107_1 to 107_n by performing logic combinations of the first information and the second information such that the selectable entities 102_1 to 102_n belonging to a currently selected group indicated by the current select information correspond to the selected and/or newly defined group of channels.

Figure 3:
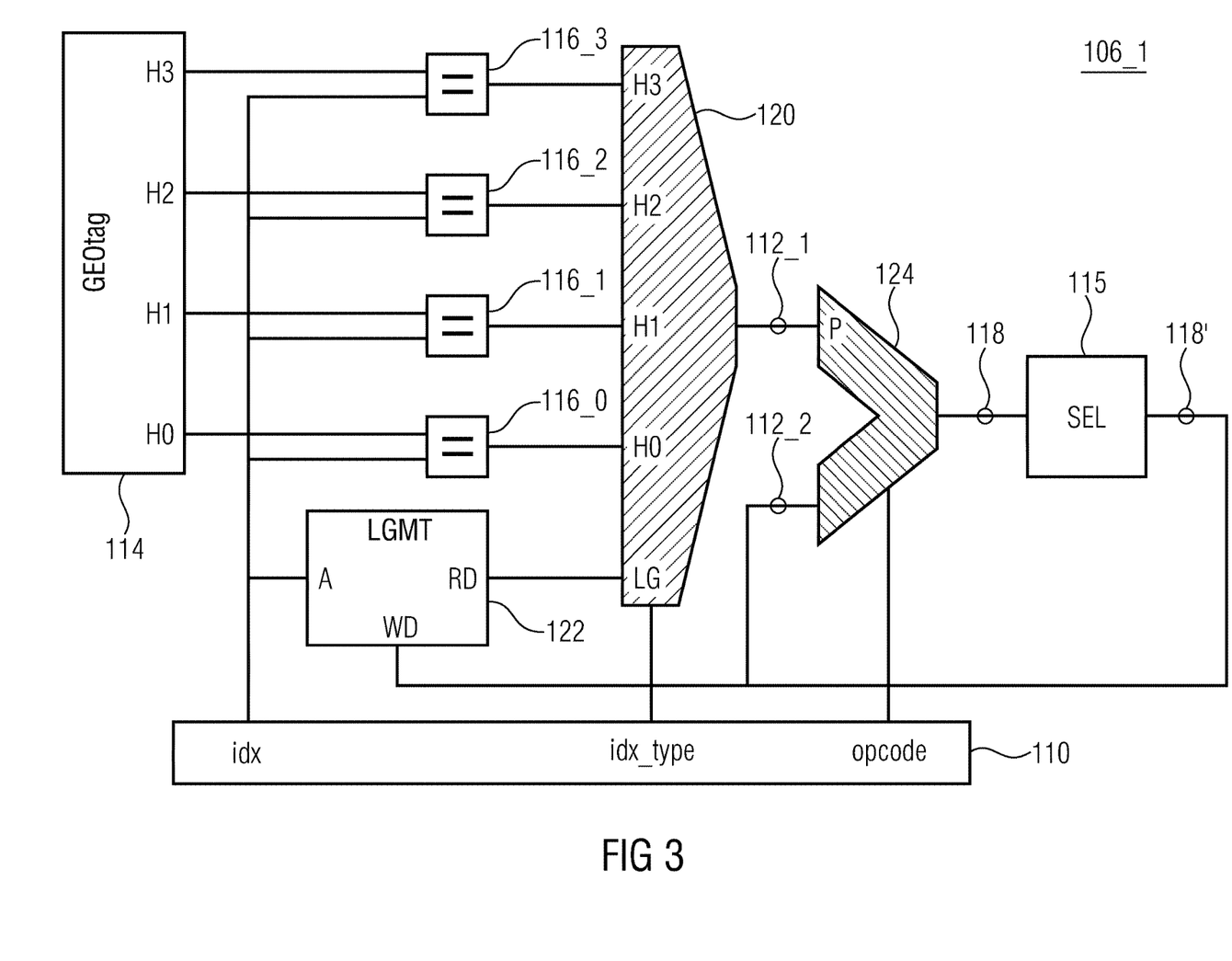
FIG. 3 shows a schematic block diagram of a select processor according to an embodiment of the present invention.

FIG. 3 shows a schematic block diagram of a select processor according to an embodiment of the present invention. The select processor shown in FIG. 3 can be, for example, the select processor of the first selectable entity 102_1 of the plurality of selectable entities 102_1 to 102_n. Naturally, the following description also applies to the select processors of the other selectable entities 102_1 to 102_n.

The select processor 106_1 can comprise a control input 110 for the common control information 110 (idx, idx_type, opcode), wherein the select processor 106_1 is configured to derive at least one out of the first information 112_1 and a selected logic combination out of the selectable logic combinations based on the common control information 110.

As already mentioned, each of the selectable entities 102_1 to 102_n may have an associated physical address (GEOtag). The physical address (GEOtag) may comprise a plurality of address component values. The select processor 106_1 can be configured to derive the first information 112_1 by comparing a selectable address component value of the unique physical address associated with the selectable entity 102_1 with an address component value indicated by the common control information 110. For example, the common control information 110 may comprise an idx component indicating the selectable address component out of the plurality of selectable address components of the unique physical address associated with the selectable entity 102_1.

For example, the select processor 106_1 can comprise a physical address memory 114 having stored thereon the unique physical address (GEOtag) associated with the selectable entity 102_1. The physical address memory 114 may comprise a plurality of outputs H0, H1, H2 and H3 for providing the plurality of address component values of the unique physical address associated with the selectable entity 102_1. The select processor 106_1 may further comprise a plurality of comparison units 116_0 to 116_3, inputs of which are connected to the plurality of outputs H0 to H3 of the physical address memory 114, wherein the plurality of comparison units 116_1 to 116_3 are configured to compare the corresponding address component value of the unique physical address (GEOtag) with the address component value indicated by the common control information 110 and to provide at its outputs comparison results. The selectable entity 106_1 may further comprise a multiplexer 120, inputs of which are connected to outputs of the plurality of comparison units 116_0 to 116_3, wherein the multiplexer 120 can be configured to provide one out of the comparison results provided by the plurality of comparison units 116_0 to 116_3 at its output as the first information 112_1 in dependence on the selected component of the selectable components of the physical address (GEOtag) indicated by the common control information 110. For example, the common control information 110 may comprise an idx_type component indicating the comparison result out of the comparison results to be provided at its output as the first information 112_1.

Further, the select processor 106_1 can comprise a table 122 (LGMT) having stored thereon at least one logic group information obtained by storing a previously determined current select information 118, wherein the table 122 is configured to provide a logic group information of the at least one logic group information as first information 112_1 indicated by the common control information 110.

In embodiments, the output RD of the table can be connected to a further input LG of the multiplexer 120, wherein the table 122 is configured to provide a logic group information of the at least one logic group information as first information 112_1 indicated by the common control information 110.

In embodiments, the second information 112_2 can be a previous select information 118' describing whether the selectable entity 102_1 belonged to a previously selected group. As exemplarily shown in FIG. 3, the previous select information 118' may be obtained by delaying the current select information 118, for example, by one (or more) clock cycles. For example, the select processor 106_1 may comprise a SEL-unit 115 configured to delay the current select information 118 for one (or more) clock cycles, in order to obtain the second information 112_2.

The select processor 106_1 may further comprise a logical combiner 124 configured to perform the selectable logic combination of the first information 112_1 present at its first input and the second information 112_2 present at its second input in order to provide at its output the current select information 118. As shown in FIG. 3, the output of the logical combiner 124 can be connected to the second input of the logical combiner 124. Further, the select processor 106_1, or more precisely the logical combiner 124, can be configured to perform the selected logic combination out of the selectable logic combinations indicated by the common control information 110. For example, the common control information 110 may comprise an opcode component indicating the selected logic combination out of the plurality of selectable logic combinations.

Figure 4:
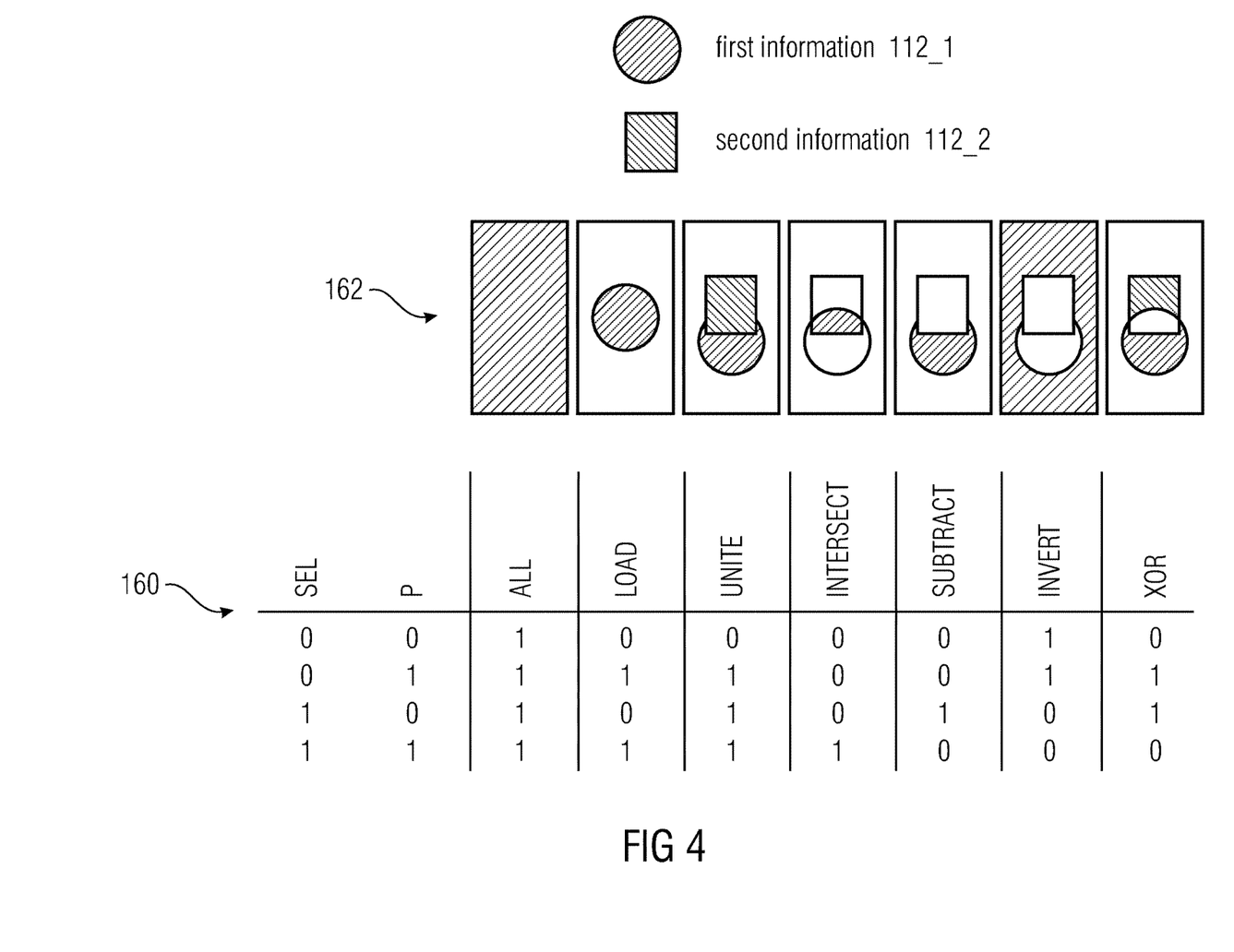
FIG. 4 shows in a table exemplary selectable logic combinations and set diagrams of the exemplary selectable logic combinations shown in the table, according to an embodiment of the present invention.

FIG. 4 shows in a table 160 exemplary selectable logic combinations and set diagrams (or Venn diagrams) 162 of the exemplary selectable logic combinations shown in the table 160, according to an embodiment. As shown in FIG. 4, the select processor 106_1 may be configured to perform the logic combinations unite, intersect, subtract, invert and XOR. Further, the select processor 106_1 may be configured to perform operations such as loading (load) a logical group, e.g., stored in the table 122 (see FIG. 3).

Further in FIG. 4, the circles represent the first information 112_1 present at the first input of the logical combiner 124 (see FIG. 3), the rectangles represent the second information 112_2 present at the second input of the logical combiner 124 and the Venn diagrams represent current select information 118 provided by the logical combiner 124.

Figure 5:
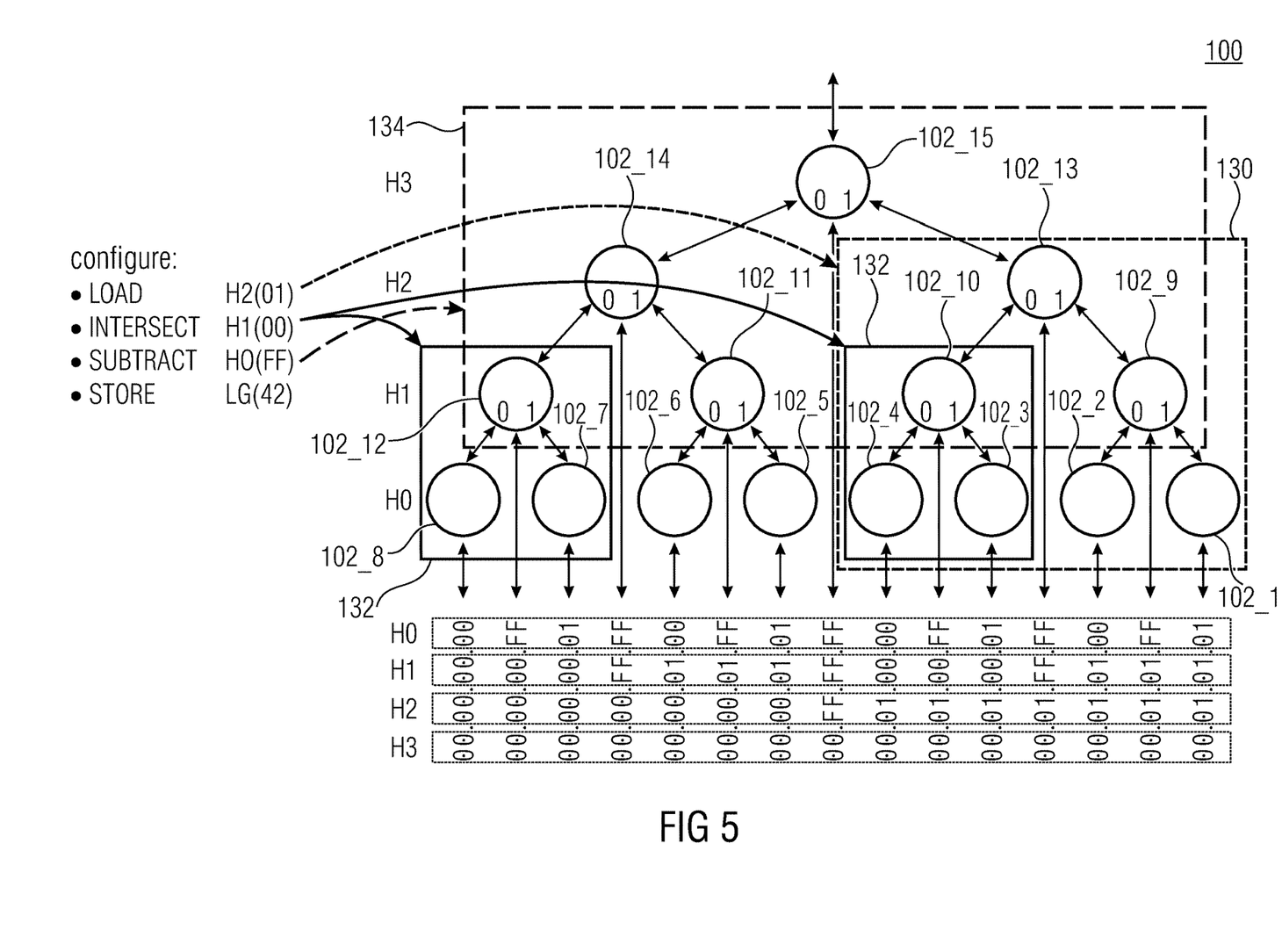
FIG. 5 shows a schematic block diagram of an automatic test equipment according to an embodiment of the present invention.

FIG. 5 shows a schematic block diagram of an automatic test equipment 100, according to an embodiment of the present invention. The automatic test equipment 100 comprises a plurality of selectable entities 102_1 to 102_n (n=15).

As indicated in FIG. 5 with H0 to H3, the selectable entities 102_1 to 102_15 (n=15) may have associated hierarchy levels along which the selectable entities 102_1 to 102_n (n=15) are connected to the controller 104 (see FIG. 2). Thereby, the selectable components of the unique physical address associated with the selectable entity can be associated with the hierarchy levels.

In the following, it will be explained how the select processors 106_1 to 106_n of the selectable entities 102_1 to 102_n can be used to form new logical groups on the basis of selectable logic combinations of the first information 112_1 and the second information 112_2, wherein the new logical groups can be stored in the table 122 which can be used afterwards for loading the respective group of channels.

In detail, in FIG. 5 a first hierarchy level H0 comprises the selectable entities 102_1 to 102_8, wherein a second hierarchy level H1 comprises the selectable entities 102_9 to 102_12, wherein a third hierarchy level H2 comprises selectable entities 102_13 and 102_14, wherein a fourth hierarchy level H3 comprises the selectable entity 102_15.

Further, in FIG. 5 three groups of selectable entities are illustrated. A first group 130 comprises the selectable entities 102_1, 102_2, 102_3, 102_4, 102_9, 102_10 and 102_13. A second group 132 comprises the selectable entities 102_3, 102_4, 102_10, 102_7, 102_8 and 102_12. A third group 134 comprises the selectable entities 102_9, 102_10, 102_11, 102_12, 102_13, 102_14 and 102_15.

Subsequently, it is described by way of example how a new logical group can be defined using the select processors 106_1 to 106_n (n=15) of the selectable entities 102_1 to 102_n (n=15). In other words, subsequently, it is described how all leafs of a sub-tree can be selected by using the select processors 106_1 to 106_n of the selectable entities 102_1 to 102_n (n=15). In the example, all nodes which are part of the first group 130 and second group 132 but not part of the third group 134 should be selected. For this purpose, the following syntax may be communicated to the select processors 106_1 to 106_n via the common control information 110:

| | |
|---|---|
| LOAD | H2(01) |
| INTERSECT | H1(00) |
| SUBTRACT | H0(FF) |
| STORE | LG(42) |

By load H2(01) the first group 130 is loaded. With intersect H1(00) the second group 132 is intersected with the first group 130 such that a new group is formed having the selectable entities 102_3, 102_4 and 102_10. From this new group the third group 134 is subtracted such that a further new group having the selectable entities 102_3 and 102_4 is generated. With store LG(42) this new logical group is stored in the table 122.

Subsequently, it is described how long it takes to generate this new logical group. For the four instructions, including overhead, in total 96 bits need to be transferred. Over a link having e.g. 6 GBit/s bandwidth, with the aforementioned parameters, generating the new logical group may take 22 ns.

In embodiments, geographical groups are defined by topology. The select processors can be used to define many user defined logical groups. Set arithmetics can be used to derive very fast new logical groups from existing groups (geographical/logical).

In embodiments, the automatic test equipment 100 may comprise a plurality of channels connected to the controller 104 via a network, when the plurality of selectable entities 102_1 to 102_n form selectable nodes of the network. For example, the network between the controller 104 and the plurality of channels may comprise a tree structure.

Further, the automatic test equipment 100 may comprise at least two different modular components building on each other for providing a plurality of channels connected to the controller 104. The plurality of channels can be connected to the controller 104 via the plurality of entities 102_1 to 102_n, wherein the plurality of selectable entities 102_1 to 102_n can be distributed over the at least two different modular components. The different modular components may have associated different hierarchy levels H0 to H3, wherein the physical address associated with the selectable entity comprises a plurality of components, each component being associated with one of the different hierarchy levels, as will become clear from the discussion of FIG. 6.

Figure 6:
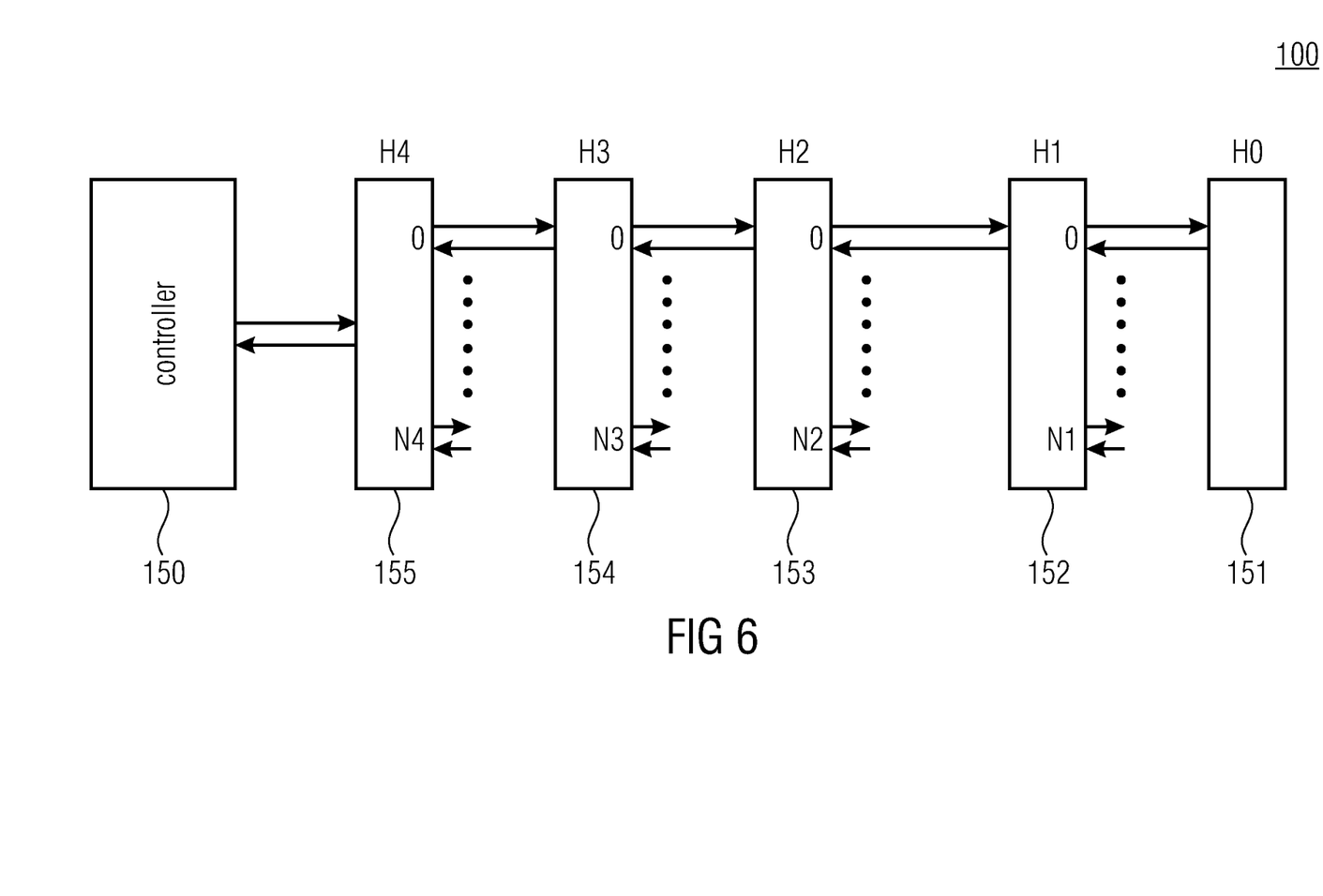
FIG. 6 shows a schematic block diagram of an automatic test equipment according to the embodiment of the present invention.

FIG. 6 shows a schematic block diagram of an automatic test equipment 100 according to an embodiment of the present invention. The automatic test equipment 100 comprises a controller 150, a first component 151 having a first hierarchy level H0, a second component 152 having a second hierarchy level H1, a third component 153 having a third hierarchy level H2, a fourth component 154 having a fourth hierarchy level H3 and a fifth component 155 having a fifth hierarchy level H5.

Embodiments of the present invention provide several advantages such as
1) unified across network hierarchy (leafs, nodes),
2) flexible, software based approach of select processor and select program to define groups,
3) fast and efficient setup due to group arithmetics,
4) arithmetics allow any mixture of geographical and logical addressing,
5) scalability due to the distributed processing,
6) flat table, no fixed number of logical dimensions,
7) no limitation how many groups a node can belong to,
8) much more groups, 9) group ID (managed by software) with each access to also select other resources like indirect address pointers, consolidation groups, etc., 10) extendable, mix of nodes with different LGMT size is possible.

Figure 7:
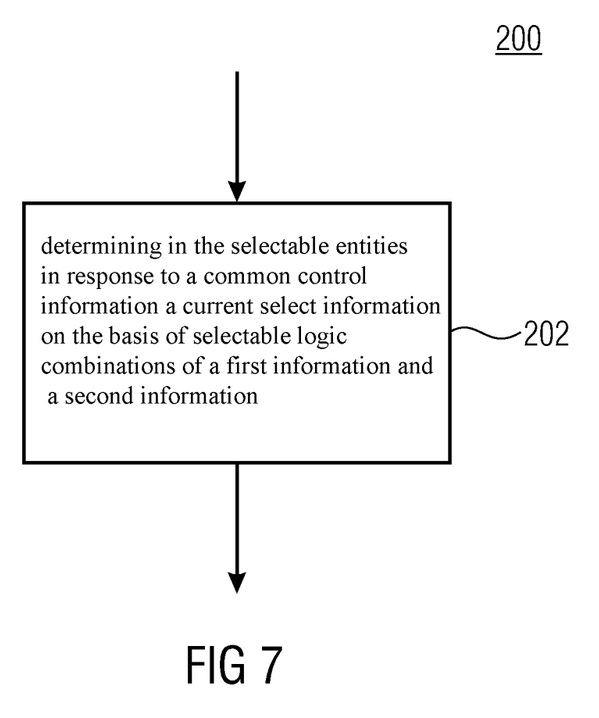
FIG. 7 shows a flow chart of a method 200 for operating an automatic test equipment, according to an embodiment of the present invention.

FIG. 7 shows a flow chart of a method 200 for operating an automatic test equipment, according to an embodiment of the present invention. The method comprises a step of 202 determining in the selectable entities in response to a common control information a current select information on the basis of selectable logic combinations of a first information describing whether the selectable entity belongs to a first group and a second information describing whether the selectable entity belongs to a second group.

Although the above described embodiments relate to an automatic test equipment it is noted that the present invention is not limited to such embodiments. Rather, the teachings disclosed herein can also be applied to any distributed hardware structure having multi-casting functions or capabilities.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An automatic test equipment comprising:
a controller and a plurality of selectable entities comprising associated physical addresses of geographic locations,
wherein the selectable entities are coupled to the controller,
wherein, for a respective selectable entity of the selectable entities, the respective selectable entity comprises a select processor configured to determine, in response to a common control information received by the selectable entities, a current select information related to a currently selected group of the selectable entities based on at least one of a plurality of selectable logic combinations of a first information that describes whether the respective selectable entity belongs to a first group of the selectable entities, wherein the first information is based on the associated physical addresses, and a second information that describes whether the respective selectable entity belongs to a second group of the selectable entities,
wherein the select processor is further configured to derive the first information by comparing a selectable address component value of a unique physical address of a first geographic location associated with the respective selectable entity with an address component value indicated by the common control information.

2. The automatic test equipment according to claim 1, wherein the select processor comprises a control input for the common control information, wherein the select processor is configured to derive at least one of the first information or a selected logic combination from the selectable logic combinations based on the common control information.

3. The automatic test equipment according to claim 1, wherein the current select information indicates whether the respective selectable entity belongs to the currently selected group.

4. The automatic test equipment according to claim 1, wherein the select processor comprises a table operable to store at least one logic group information acquired by storing a previously determined current select information, wherein the table is configured to output a logic group information of the at least one logic group information as the first information indicated by the common control information.

5. The automatic test equipment according to claim 4, wherein the select processor further comprises:
   a physical address memory comprising the unique physical address associated with the respective selectable entity, wherein the physical address memory further comprises a plurality of outputs for providing a plurality of components of the physical address;
   a plurality of comparison units comprising respective first inputs connected to the plurality of outputs of the physical address memory to receive a respective component of the physical address, respective second inputs operable to receive the address component value indicated by the common control information, and respective outputs, wherein the plurality of comparison units are configured to compare the respective first inputs with the respective second inputs to provide respective comparison results at the respective outputs; and
   a multiplexer comprising a mux output and a plurality of mux inputs connected to the respective outputs of the plurality of comparison units, wherein the multiplexer is configured to provide one of the respective comparison results at the mux output as the first information based on a selected component of a plurality of selectable components of the physical address indicated by the common control information.

6. The automatic test equipment according to claim 5, wherein the table comprises a table output, and wherein the table output is coupled to a mux input of the multiplexer to provide the logic group information.

7. The automatic test equipment according to claim 6, wherein the selectable entities comprise associated hierarchy levels along which the selectable entities are coupled to the controller, and wherein a plurality of selectable components of the physical address associated with the respective selectable entity are associated with the hierarchy levels.

8. The automatic test equipment according to claim 1, wherein the second information is a previous select information that describes whether the respective selectable entity belonged to a previously selected group of the selectable entities.

9. The automatic test equipment according to claim 1, wherein the select processor comprises a logical combiner including a first input, a second input, and a combiner output, wherein the logical combiner is configured to perform a selectable logic combination of the first information at the first input and the second information at the second input to provide at the combiner output the current select information.

10. The automatic test equipment according to claim 9, wherein the combiner output received at the second input of the logical combiner.

11. The automatic test equipment according to claim 1, wherein the select processor is further configured to perform a selected logic combination from the selectable logic combinations indicated by the common control information.

12. The automatic test equipment according to claim 1, further comprising a plurality of selectable channels coupled to the controller via the selectable entities.

13. The automatic test equipment according to claim 12, further comprising logic configured to select a group of channels from the plurality of selectable channels by performing at least one of the selectable logic combinations of the first information and the second information to provide the selected group of channels that corresponds to the selectable entities belonging to the currently selected group indicated by the current select information.

14. The automatic test equipment according to claim 1, further comprising at least two different modular components for providing a plurality of channels coupled to the controller via the plurality of selectable entities, and wherein the plurality of selectable entities are distributed in the at least two modular components.

15. The automatic test equipment according to claim 14, wherein different modular components comprise associated different hierarchy levels, and wherein each physical address associated with the selectable entities comprises a plurality of components each component being associated with one of the different hierarchy levels.

16. The automatic test equipment according to claim 1, further comprising a plurality of channels coupled to the controller via a network, and wherein the plurality of selectable entities represent selectable nodes of the network.

17. The automatic test equipment according to claim 16, wherein the network comprises a tree structure.

18. The automatic test equipment according to claim 1, wherein the respective selectable entity further comprises a first data port and at least one second data port, wherein the respective selectable entity is configured to couple the first data port and the at least one second data port if the current select information indicates that the respective selectable entity belongs to the currently selected group.

19. The automatic test equipment according to claim 1, wherein the associated physical addresses comprise associated unique physical addresses derived from paths along which the selectable entities are coupled to the controller.

20. A method comprising:
   operating an automatic test equipment comprising a controller and a plurality of selectable entities comprising associated physical addresses corresponding to geographic locations, wherein the selectable entities are coupled to the controller;
   determining for a respective selectable entity of the selectable entities, in response to a common control information received by the selectable entities, a current select information related to a currently selected group of the selectable entities based on at least one of a plurality of selectable logic combinations of a first information that describes whether the respective selectable entity belongs to a first group of the selectable entities, wherein the first information is based on the associated physical addresses, and a second information that describes whether the respective selectable entity belongs to a second group of the selectable entities; and deriving the first information by comparing a selectable address component value of a unique physical address of a first geographic location associated with the respective selectable entity with an address component value indicated by the common control information.

21. A non-transitory digital storage medium having stored thereon a computer program for performing a method comprising:

operating an automatic test equipment comprising a controller and a plurality of selectable entities comprising associated physical addresses corresponding to geographic locations, wherein the selectable entities are connected to the controller;

determining for a respective selectable entity of the selectable entities, in response to a common control information received by the selectable entities, a current select information related to a currently selected group of the selectable entities based on at least one of a plurality of selectable logic combinations of a first information that describes whether the respective selectable entity belongs to a first group of the selectable entities, wherein the first information is based on the associated physical addresses, and a second information that describes whether the respective selectable entity belongs to a second group of the selectable entities; and deriving the first information by comparing a selectable address component value of a unique physical address of a first geographic location associated with the respective selectable entity with an address component value indicated by the common control information.

* * * * *